(12) United States Patent
Campbell et al.

(10) Patent No.: US 10,321,036 B2
(45) Date of Patent: *Jun. 11, 2019

(54) LENS AND SENSOR POSITIONING SYSTEM

(71) Applicant: GoPro, Inc., San Mateo, CA (US)

(72) Inventors: Scott Patrick Campbell, Belmont, CA (US); Leo Baldwin, Seattle, WA (US); Gary Fong, Cupertino, CA (US)

(73) Assignee: GoPro, Inc., San Mateo, CA (US)

( * ) Notice: Subject to any disclaimer, the term of this patent is extended or adjusted under 35 U.S.C. 154(b) by 45 days.

This patent is subject to a terminal disclaimer.

(21) Appl. No.: 15/895,273

(22) Filed: Feb. 13, 2018

(65) Prior Publication Data

US 2018/0241918 A1     Aug. 23, 2018

Related U.S. Application Data

(63) Continuation of application No. 15/173,524, filed on Jun. 3, 2016, now Pat. No. 9,930,234.

(51) Int. Cl.
*H04N 5/225* (2006.01)
*G02B 7/02* (2006.01)

(52) U.S. Cl.
CPC ........... *H04N 5/2254* (2013.01); *G02B 7/022* (2013.01); *G02B 7/023* (2013.01); *H04N 5/2252* (2013.01); *H04N 5/2253* (2013.01)

(58) Field of Classification Search
CPC .. H04N 5/2254; H04N 5/2252; H04N 5/2253; G02B 7/022; G02B 7/023
See application file for complete search history.

(56) References Cited

U.S. PATENT DOCUMENTS

| 4,444,471 A | 4/1984 | Ford |
| 2002/0089176 A1 | 7/2002 | Iwasaki |
| 2008/0131110 A1 | 6/2008 | Lee |
| 2008/0291549 A1 | 11/2008 | Yoshida |
| 2008/0316623 A1 | 12/2008 | Aoki |
| 2011/0102921 A1 | 5/2011 | Sato |
| 2012/0075520 A1 | 3/2012 | Tecu |

*Primary Examiner* — Shahbaz Nazrul
(74) *Attorney, Agent, or Firm* — Young Basile Hanlon & MacFarlane, P.C.

(57) ABSTRACT

A positioning system is designed to align a lens barrel with a sensor assembly. A first end of a lens barrel includes ridges along an edge. The sensor assembly includes a recessed channel with reciprocal ridges for mating with the ridges of the lens barrel. The sensor assembly also includes a plurality of shim platforms structured, each structured to position a wedge shaped shim, the wedge shaped shim including a flat bottom to slide on the shim platform and raise or lower the lens barrel relative to the reciprocal ridges on which the lens barrel rests.

20 Claims, 5 Drawing Sheets

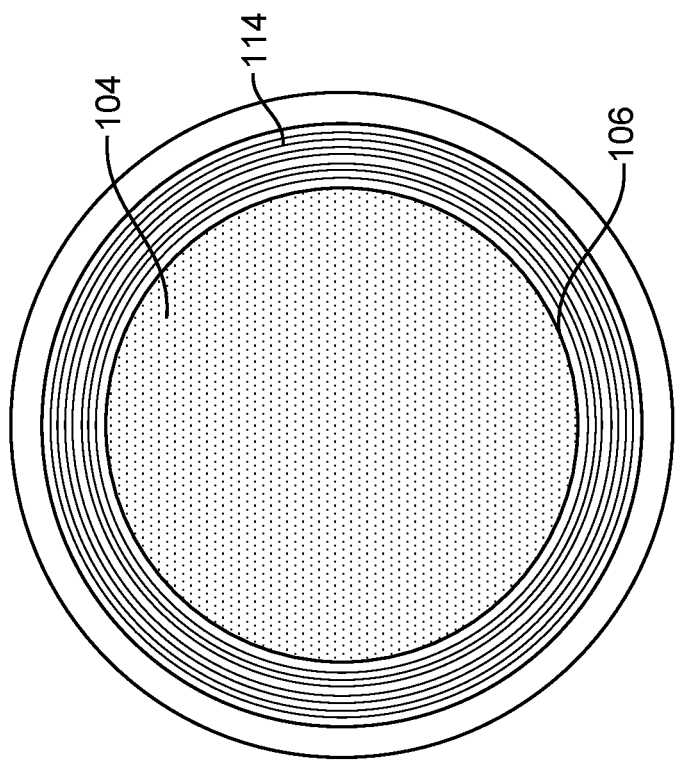
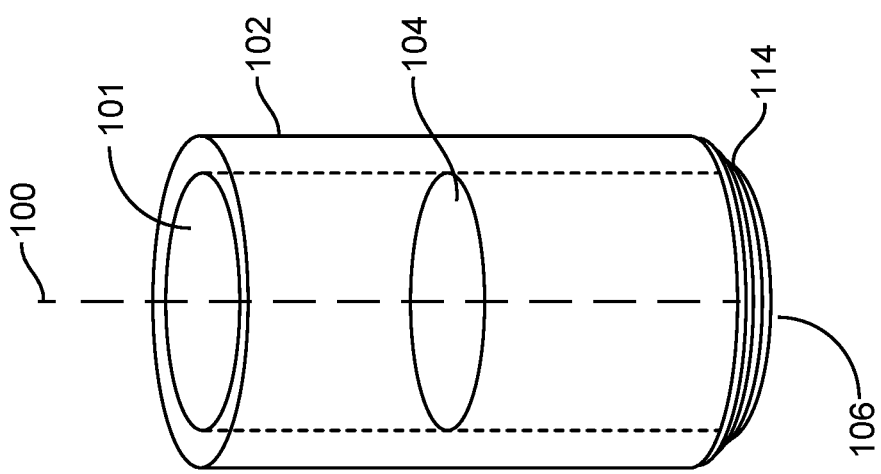
FIG. 2b
FIG. 2a

LENS AND SENSOR POSITIONING SYSTEM

CROSS REFERENCE TO RELATED APPLICATIONS

This application is a continuation of U.S. application Ser. No. 15/173,524, filed Jun. 3, 2016, which is incorporated by reference in its entirety.

BACKGROUND

Technical Field

This disclosure relates to cameras, and more specifically, to positioning systems for lens and image sensor assemblies.

Description of the Related Art

Within a camera, the lens and the image sensor must be aligned to capture an image or a video. The lens captures light rays from an object in front of the camera and focuses the light rays at a single point when the object is in focus. The image sensor captures the focused light rays from the lens and converts the light rays into an image. When assembling a camera, accurately aligning the lens and the image sensor along an optical axis can be difficult to achieve. Accordingly, present lens positioning configurations lack accuracy and precision for alignment of the lens and the image sensor of a camera along an optical axis.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

Figure (or "FIG.") 1 illustrates a lens and image sensor positioning system, according to one example embodiment.

FIGS. 2a and 2b illustrate multiple perspective views of a lens barrel, according to one example embodiment.

DETAILED DESCRIPTION

Figure 1:
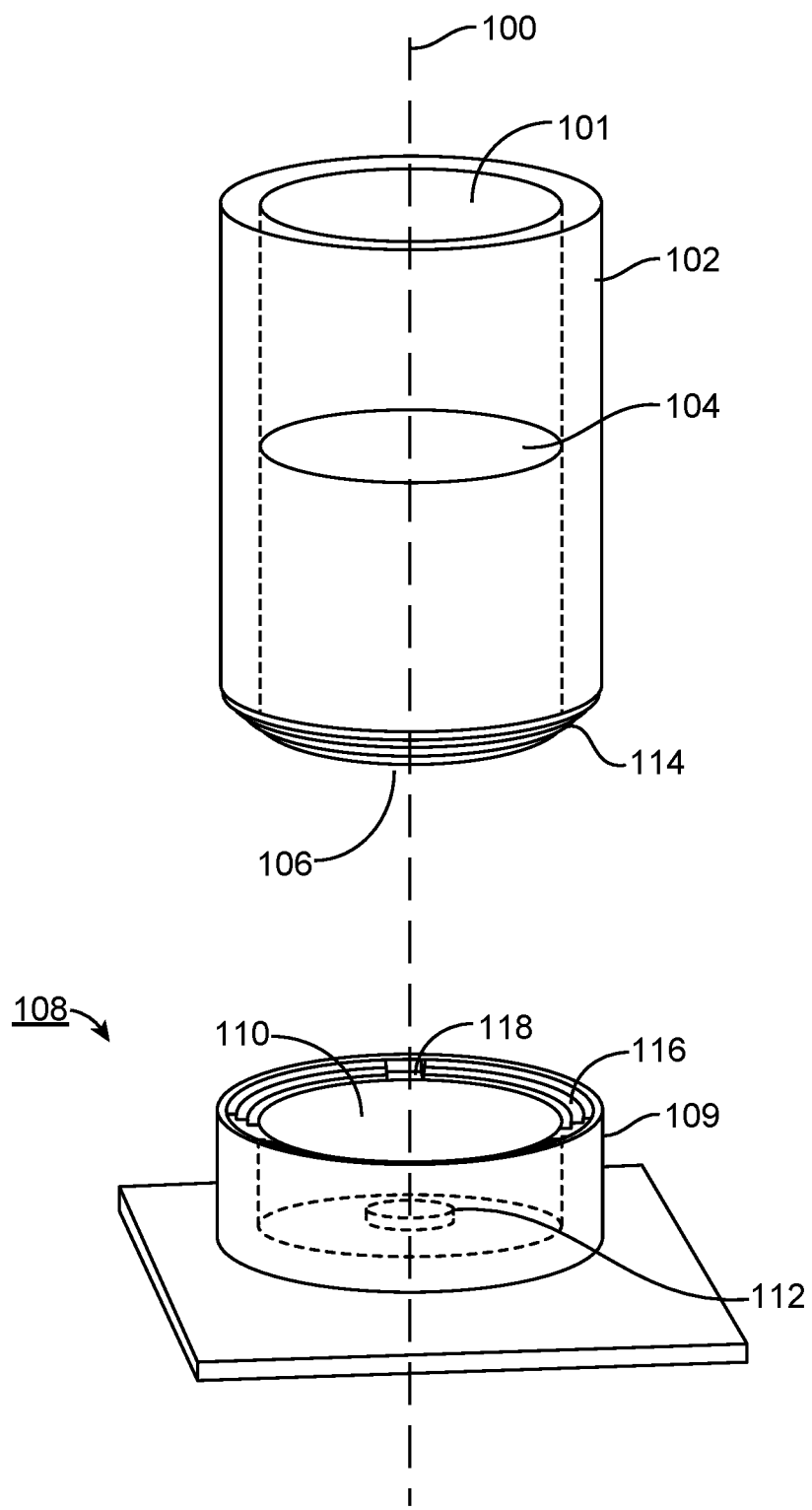

The figures and the following description relate to example embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview Configuration

In one example embodiment, an image sensor assembly and a lens barrel may be configured to mate and align along an optical axis. The lens barrel may be structured as a cylinder and may include a lens secured within. The lens barrel may include a first end with a lens opening and a second end with a lens window. The first end of the lens barrel further can include one or more notches (generally, notches).

The image sensor assembly may include a housing with a recessed channel to partially enclose an image sensor. Along an outermost portion of the recessed channel may be one or more ridges (generally, ridges) configured to reciprocally mate with the one or more notches of the lens barrel. Embedded among the ridges may be one or more shim platforms (generally, shim platforms) that are configured to position a wedge-shaped shim. The shims allow for fine-tune adjustment of the position of the lens barrel 102 relative to the image sensor assembly 108 when the ridges and notches are mated, helping to provide an accurate alignment of the lens barrel with the image sensor assembly along the optical axis.

Example Lens and Sensor Assembly Configuration

Cameras have several components that work together to allow them to capture photos and videos. Two components of cameras are the lens and the image sensor. The lens is the optical element of a camera that captures light rays and focuses the light rays at a single point when a subject in front of the camera is in focus. A camera lens may be a curved piece of glass or plastic, and the curvature of a lens can vary in degree of convexity to provide users with better quality images in different settings.

The image sensor captures the focused light rays from the lens and converts the light rays into an image. To capture a quality photo or video, the lens and the image sensor are aligned along an optical axis that allows the image sensor to capture the focused light rays from the lens. Accurately aligning these two components along the optical axis can be difficult to achieve due to manufacturing tolerances, lack of proper equipment, and other various reasons.

Turning now to Figure (FIG.) 1, it illustrates a lens and image sensor positioning system, according to one example embodiment. In FIG. 1, a lens barrel 102 may include a lens window 101, a lens 104, a lens opening 106, and a plurality of notches 114. The image sensor assembly 108 may include a housing 109, a recessed channel 110, an image sensor 112, one or more ridges 116 (generally, ridges 116), and a one or more shim platforms 118 (generally, shim platforms 118).

In the example of embodiment of FIG. 1, the lens barrel 102 mates with the image sensor assembly 108. This configuration helps to align the lens 104 with the image sensor 112 along an optical axis 100. To mate the lens barrel 102 and the image sensor assembly 108, the lens barrel 102 has the notches 114 at a first end that reciprocally mate with the ridges 116 of the image sensor assembly. The shim platforms 118 are embedded within the region of the ridges 116 of the image sensor assembly 108. Each shim platform 118 may be configured to hold a wedge-shaped shim. The shims allow for fine-tune adjustment of the position of the lens barrel 102 relative to the image sensor assembly 108 when the ridges 116 and the notches 114 are mated. This configuration helps to provide an accurate alignment between the lens barrel and the image sensor assembly along the optical axis 100. The configuration of this positioning mechanism is further described below. Once the lens barrel 102 and the image sensor assembly 108 are in alignment, this system can be secured within a camera housing.

In addition, the lens and sensor positioning system can have other example embodiments. An example embodiment may include a lens barrel with a tapered surface at a first portion of the lens barrel and an image sensor assembly with a countersink surface along an outermost portion of the recessed channel, wherein the tapered surface and the countersink surface are configured to mate. The tapered surface and the countersink surface can be substantially flat surfaces. Embedded within the region of the countersink surface can be the shim platforms that are configured to hold the wedge-shaped shims. Alternate example embodiments may include alignment mechanisms such as tongue and groove joints, guide pins, or the like.

Referring now to FIGS. 2a and 2b, illustrated are multiple perspective views of a lens barrel, according to one example embodiment. As previously described for FIG. 1, the lens barrel 102 may include the lens window 101, the lens 104, the lens opening 106, and the plurality of notches 114. The lens barrel 102 may be a cylindrical tube that has the lens opening 106 at a first end and the lens window 101 at a second end. The optical axis 100 can extend down the length of the lens barrel 102 between the centers of the lens opening 106 and the lens window 101. The lens 104 may be the optical element of the camera and may be composed of a curved, transparent piece of glass or plastic. The lens 104 may be secured within the lens barrel 102 and oriented such that the lens is parallel to the lens opening 106 and the lens window 101. The lens window 101 allows the light rays from the object in front of the camera to enter the lens barrel 102 and reach the lens 104.

In some example embodiments, the lens barrel 102 has a ledge machined along the inner diameter of the lens barrel that may be configured to position the lens 104 within the lens barrel. The inner diameter of the lens barrel 102 may be slightly smaller than the diameter of the lens 104 such that the lens is secured once positioned. In other embodiments, the lens 104 may be secured by other securing mechanisms, such as adhesives, mechanical fasteners, or other suitable securing mechanisms. The lens barrel 102 also can be configured to secure more than one lens.

In the example embodiment of FIGS. 2a and 2b, the plurality of notches 114 may be located around the outer surface of the lens barrel 102 and at the furthermost portion of the first end with the lens opening 106. Each notch 114 may be circumferential around the outer surface of the lens barrel 102 and is shaped as a step. The circumference of each successive notch 114 becomes incrementally smaller as the distance to the lens opening 106 of the lens barrel decreases. Each notch 114 can be configured to reciprocally mate with the ridges 116 of the image sensor assembly 108 and allow the lens barrel 102 to be positioned relative to the image sensor assembly. In some example embodiments, the lens barrel 102 may be configured such that the plurality of notches 114 is located along the length of the lens barrel and comprise a portion of the length that does not extend to the end of the lens barrel. In other embodiments, the notches 114 may not be circumferential and may be positioned at intervals around the lens opening 106 of the lens barrel 102. The configuration of the notches 114 can also vary in shape, given that the various configurations reciprocally mate with the ridges 116.

Figure 3B:
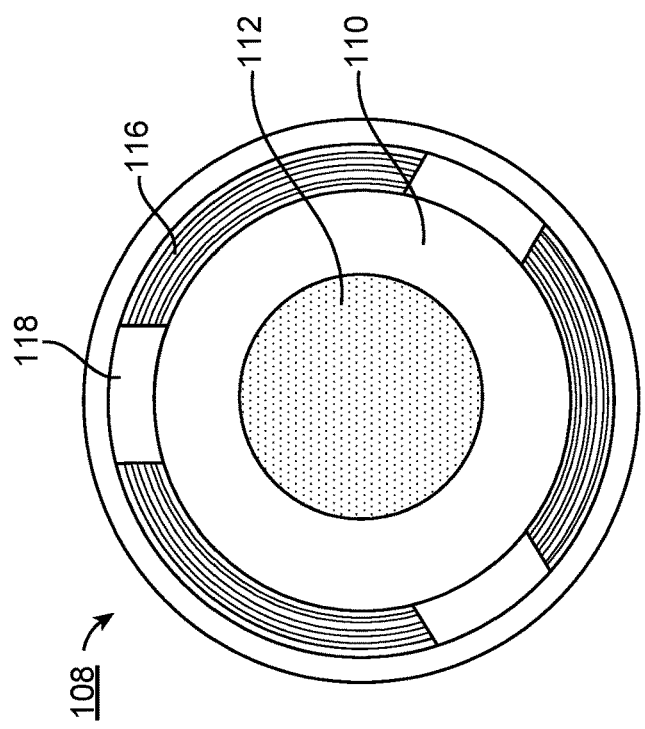
FIGS. 3a and 3b illustrate multiple perspective views of an image sensor assembly, according to one example embodiment.
Figure 3A:
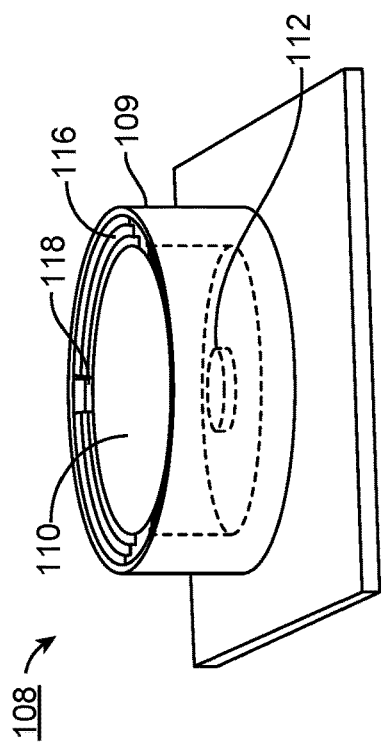

FIG. 3 illustrates a top-down view of an image sensor assembly, according to one example embodiment. As previously described for FIG. 1, the image sensor assembly 108 may include the housing 109, the recessed channel 110, the image sensor 112, the plurality of ridges 116, and the shim platforms 118. In the example embodiment of FIG. 3, the housing 109 may be cylindrical with a square base. The housing 109 may be composed of solid materials, such as metal or plastic. The recessed channel 110 may be a cylindrical pocket within the center of the cylindrical portion of the housing 109 configured to partially enclose the image sensor 112. The optical axis 100 extends through the center of the recessed channel 110 and may be orthogonal to the bottom surface of the recessed channel. The image sensor 112 may be secured to the bottom surface of the recessed channel 110, centered along the optical axis 100. The ridges 116 begin at the top surface of the housing 109 are circumferential around the uppermost portion of the recessed channel 110. Each ridge 116 is shaped as a step, such that the circumference of each successive ridge becomes incrementally smaller as the distance to the bottom surface of the recessed channel decreases. The ridges 116 of the image sensor assembly 108 are configured to reciprocally mate with the notches 114 of the lens barrel 102 and allow the lens barrel to be positioned relative to the image sensor assembly.

Figure 4:
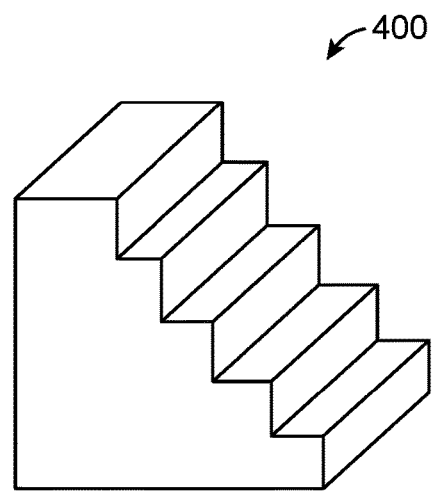
FIG. 4 illustrates a configuration of a shim, according to one example embodiment.

Within the region of the ridges 116 are the shim platforms 118. Each shim platform 118 may an open space within the ridges 116 that can be configured to hold a wedge-shaped shim, such as shim 400 as illustrated in FIG. 4. In the embodiment of FIG. 3, the housing 109 has three shim platforms 118 positioned at intervals around the recessed channel 110, but the number of shim platforms may vary in other embodiments. In the example embodiment of FIG. 3, an inner portion of the shim platform 118 begins at the edge of the recessed channel 110 and an outer portion of the shim platform extends into an outer portion of the housing 109. The bottom surface of the shim platform is a flat, smooth surface that allows shim 400 to translate towards and away from the center of the recessed channel 110. The depth and shape of each shim platform 118 may be uniform. In some example embodiments, the shim platforms 118 may extend from the recessed channel 110 through to the outer surface of the housing 109. In other example embodiments, the shim platforms 118 may be tunnels that extend from the recessed channel 110 through to the outer surface of the housing 109.

FIG. 4 illustrates a configuration of a shim, according to one example embodiment. As previously described for FIG. 3, each shim platform 118 is configured to hold a wedge-shaped shim, such as shim 400. Shim 400 may be shaped as a wedge with a flat base, wherein the angled plane of the wedge is configured similarly to the plurality of ridges 116 on the image sensor assembly 108, such that the shim comprises multiple steps that successively decrease in height. In some example embodiments, the angled plane of the wedge-shaped shim may be a substantially flat surface. In alternate example embodiments, the angled plane of the wedge-shaped shim may be a textured surface. Specifically, the textured surface may have raised portions configured to increase friction, relative to a substantially flat surface, between the shim and the lens barrel when mated. The textured surface may include, but is not limited to, a bubble pattern, a grid of raised circles, a pillow-shaped pattern, or any other similar geometry.

The overall height of the shim 400 is substantially similar to the height of the shim platform 118. This configuration allows the shim 400 to reciprocally mate with the plurality of notches 114 of the lens barrel 102. The flat base of the shim 400 allows the shim to translate along the flat surface of the shim platform 118. In other embodiments, the shim 400 can vary in height and width, such that the shim is configured to be positioned within the shim platform and to mate with the plurality of notches 114. In some example embodiments, the shim 400 may be shaped as a flat wedge without ridges, given that the wedge may be of an appropriate height to contact the lens barrel 102. The shim 400 can be composed of a variety of solid materials, for example, metal, plastic, carbon fiber, etc.

Figure 5:
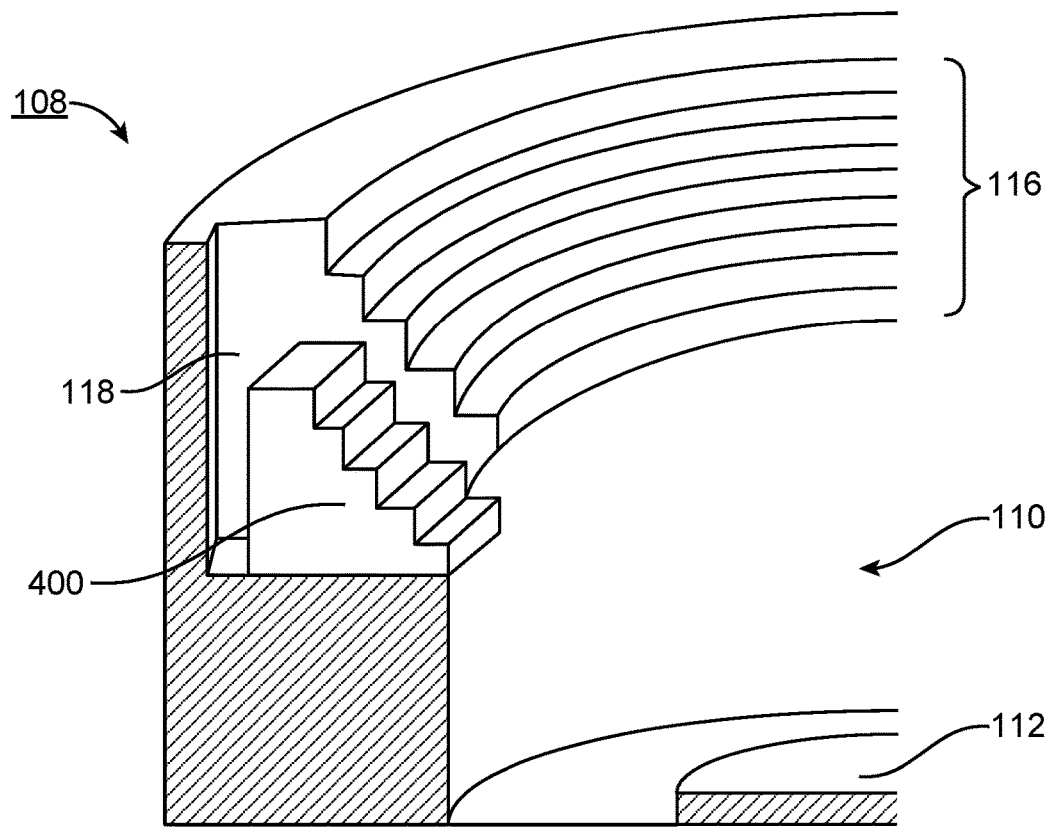
FIG. 5 illustrates a cross-sectional view of an image sensor assembly, according to one example embodiment.

FIG. 5 illustrates a cross-sectional view of an image sensor assembly, according to one example embodiment. In the example embodiment of FIG. 5, the image sensor assembly illustrates the shim 400 positioned on the shim platform 118. The shim 400 can translate towards the inner portion of the shim platform 118 or towards the outer portion of the shim platform until a desired position is achieved. Specifically, the shims 400 may be positioned to raise or lower the lens barrel 102 relative to the image sensor assembly 108 until the two assemblies are aligned along the optical axis 100.

In the example embodiment of FIG. 5, the plurality of shims 400 within the shim platforms 118 can be of uniform size. The shim 400 can be positioned within the shim platform 118 in a variety of ways, such as manually, with the use of a tool kit, with the use of machinery, or other suitable methods. Once the shim 400 has been positioned within the shim platform 118, the shim may be secured to the shim platform with a securing mechanism, such as mechanical fasteners, an adhesive that backfills the shim platform, or the like. For the example embodiment in which the shim platform 118 and the shim 400 are composed of metal, the shim can be secured with solder. In some embodiments, the image sensor assembly 108 may comprise a shim-positioning mechanism within each shim platform 118. For example, the outer surface of the housing 109 can be configured to secure mechanical fasteners, such as a wing nut or thumb screw, into the back wall of the shim platform 118 such that the mechanical fastener extends into the shim platform and adjusts the position of a shim within the shim platform.

Figure 6:
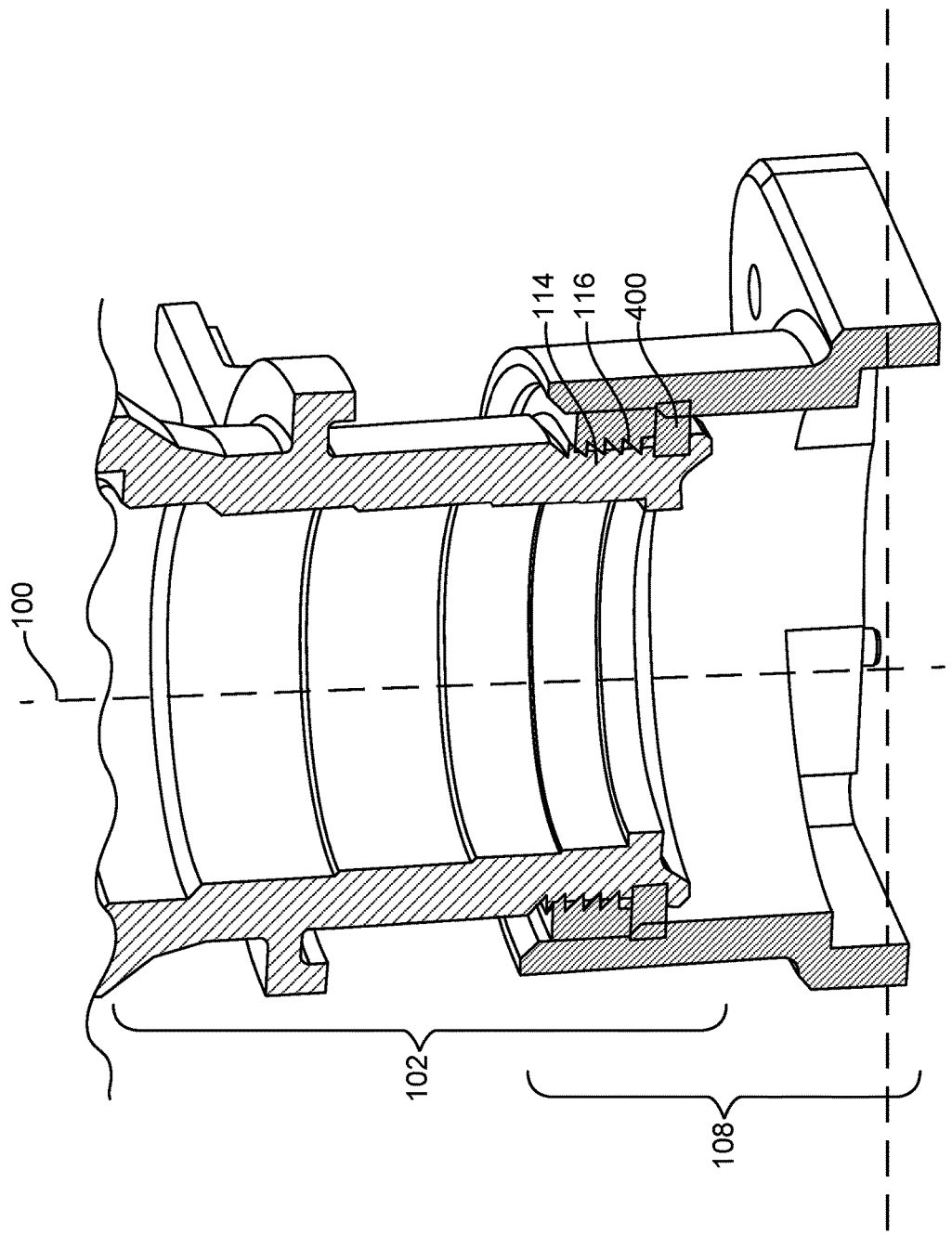
FIG. 6 illustrates a cross-sectional view of a lens and image sensor positioning system, according to one example embodiment.

FIG. 6 illustrates a cross-sectional view of a lens and image sensor positioning system, according to one example embodiment. The lens barrel 102 may be positioned such that the first end with the lens opening 106 extends into the recessed channel 110. The notches 114 of the lens barrel 102 reciprocally mate with the ridges 116 of the image sensor assembly 108, as illustrated in FIG. 6. In this position, the lens barrel 102 may be roughly aligned with the image sensor assembly 108 along the optical axis 100. The position of each shim 400 is then adjusted within respective shim platforms 118 to raise or lower the lens barrel 102 relative to the plurality of ridges 116 on which the lens barrel rests. Once the lens barrel 102 has been properly aligned with the image sensor assembly 108 along the optical axis 100, each shim 400 is secured within its respective shim platform 118.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skilled in the art will appreciate still additional alternative structural and functional designs for lens and sensor positioning systems as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An integrated image sensor and lens assembly comprising:
    an image sensor;
    an image sensor assembly comprising:
    a housing comprising a recessed channel to partially enclose the image sensor, a plurality of ridges, and a plurality of shim platforms, each shim platform structured to position a shim, each shim having a flat bottom to slide along the shim platform; and
    a lens barrel having a first portion extending into the recessed channel, the first portion having a plurality of notches configured for mating with reciprocal ridges,
    the plurality of shims, when slid along the shim platform, moving the lens barrel relative to the reciprocal ridges.

2. The integrated image sensor and lens assembly of claim 1, wherein each of the plurality of shims is substantially flat along an angled planar surface of the shim.

3. The integrated image sensor and lens assembly of claim 1, wherein an angled planar surface of each shim is a textured surface.

4. The integrated image sensor and lens assembly of claim 3, wherein the
    textured surface comprises raised portions to increase friction relative to a substantially flat surface when mated with a second surface.

5. The integrated image sensor and lens assembly of claim 1, wherein each of the plurality of shims comprise ridges on the angled planar surface configured to reciprocally mate with the plurality of notches of the lens barrel.

6. The integrated image sensor and lens assembly of claim 1, wherein each of the plurality of shim platforms are positioned at intervals around the recessed channel.

7. The integrated image sensor and lens assembly of claim 1, wherein each of the plurality of shims are of uniform shape and size.

8. The integrated image sensor and lens assembly of claim 1, wherein the lens barrel is configured to secure one or more camera lenses.

9. The integrated image sensor and lens assembly of claim 1, wherein each of the plurality of shims are secured within respective shim platforms with a securing mechanism.

10. An image sensor assembly comprising:
   a lens barrel having a first portion extending into a recessed channel, the first portion having a plurality of notches; and
   a housing comprising the recessed channel having a plurality of ridges, the plurality of ridges configured for mating with the plurality of notches, the housing further comprising a plurality of shim platforms, each shim platform structured to receive a shim, each shim having a flat bottom to be movable along the shim platform to move the lens barrel relative to the ridges.

11. The image sensor assembly of claim 10, wherein the lens barrel is configured to secure one or more camera lenses.

12. The image sensor assembly of claim 10, wherein the housing is configured to partially enclose an image sensor.

13. The image sensor assembly of claim 10, wherein each of the plurality of shim platforms are positioned at intervals around the recessed channel.

14. The image sensor assembly of claim 10, wherein the shim is wedge-shaped and is positioned within the shim platform such that an angled planar surface of the shim tapers down towards the recessed channel.

15. The image sensor assembly of claim 10, wherein each shim is secured within respective shim platforms with a securing mechanism.

16. An image sensor assembly comprising:
   a lens barrel having a first portion extending into a recessed channel, the first portion having a tapered end configured to reciprocally mate with a countersink surface; and
   a housing comprising the recessed channel having the countersink surface along an outermost portion of the recessed channel, the housing further comprising a plurality of shim platforms embedded among the countersink surface, each shim platform having an inner portion and an outer portion and structured to receive a shim, a bottom of each shim further structured to be movable on the shim platform towards an inner portion or outer portion of the shim platform to raise or lower the lens barrel relative to the countersink surface.

17. The image sensor assembly of claim 16, wherein the lens barrel is configured to secure one or more camera lenses.

18. The image sensor assembly of claim 16, wherein the housing is configured to partially enclose an image sensor.

19. The image sensor assembly of claim 16, wherein the shim is wedge-shaped and is positioned within the shim platform such that an angled planar surface of the shim tapers down towards the recessed channel.

20. The image sensor assembly of claim 16, wherein each shim is secured within respective shim platforms with a securing mechanism.

* * * * *